April 21, 1953 — W. T. DUNN — 2,635,725
POWER TRANSMISSION
Filed Oct. 15, 1947 — 3 Sheets-Sheet 1

INVENTOR.
WILLIAM T. DUNN
BY
Harness & Harris

April 21, 1953 W. T. DUNN 2,635,725
POWER TRANSMISSION
Filed Oct. 15, 1947 3 Sheets-Sheet 2

INVENTOR.
WILLIAM T. DUNN
BY
Harness & Harris

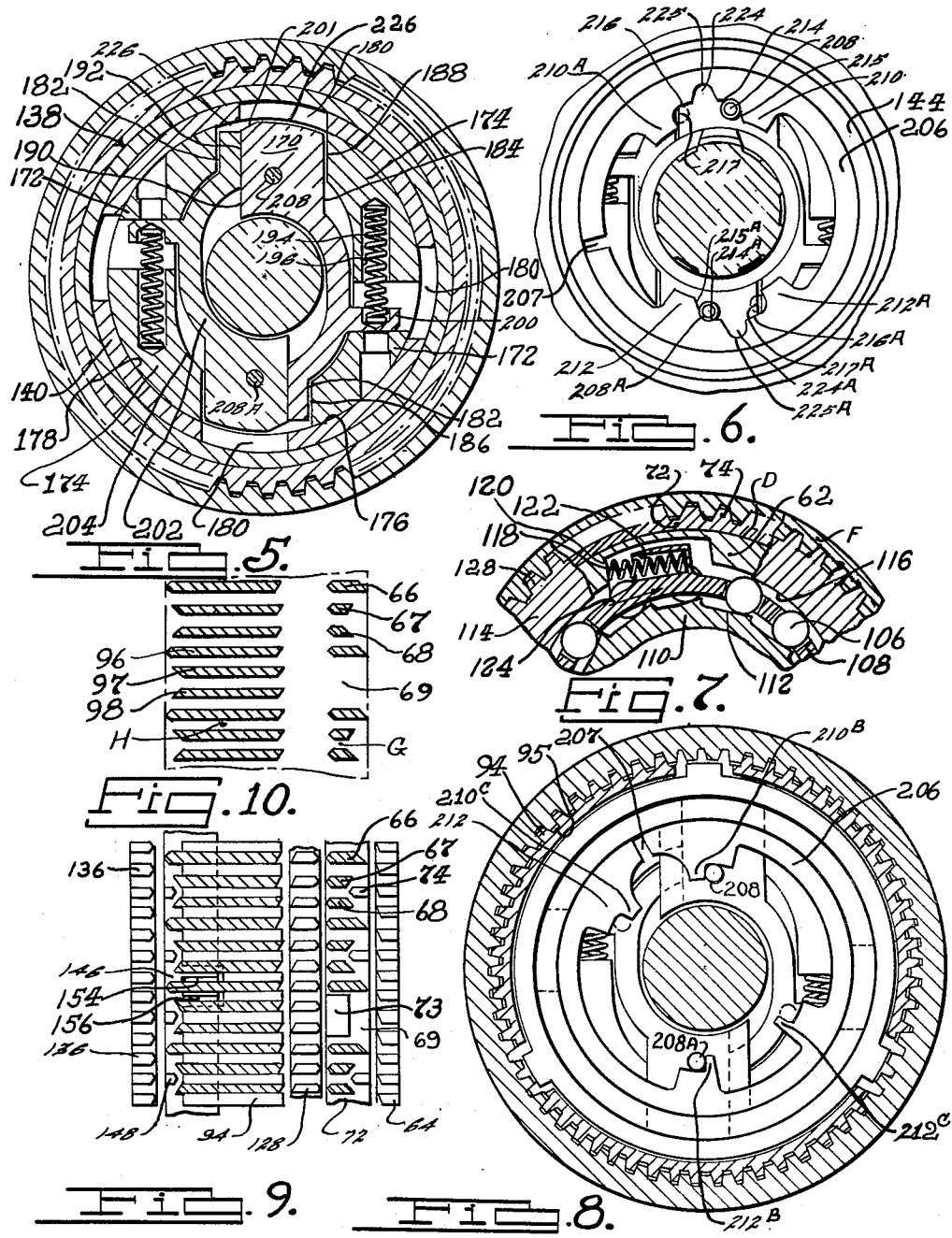

Patented Apr. 21, 1953

2,635,725

UNITED STATES PATENT OFFICE 2,635,725

POWER TRANSMISSION

William T. Dunn, Detroit, Mich., assignor to Chrysler Corporation, Highland Park, Mich., a corporation of Delaware Application October 15, 1947, Serial No. 780,095

14 Claims. (Cl. 192—48)

1

This invention relates to power transmissions and particularly to clutch mechanism embodying a centrifugal type pawl clutch device for establishing a predetermined speed ratio drive through the transmission and also embodying a one-way clutch adapted under predetermined conditions of operation to establish a freewheel drive of a slower speed from that established by the centrifugal clutch. The invention also relates to improvements in semi-automatic transmissions of the type disclosed, for example, in the copending application of Otto E. Fishburn, Serial No. 655,198, filed March 18, 1946, wherein mechanism of the above character is embodied.

In the said Fishburn transmission the centrifugal pawls of the centrifugal clutch may ratchet and rub against the pawl-receiving shell under conditions of relative rotation between the pawl shell and the pawl-carrying member.

An object of the present invention is to provide means for inhibiting rubbing and ratcheting of the pawls of the centrifugal clutch during asynchronous rotation of the pawl carrier and shell.

A further object is to provide means for blocking engagement of the centrifugal pawls at asynchronous speeds of the pawl carrier and shell under both drive torque and coast torque operating conditions.

Another object is to provide a balk ring construction for preventing engagement of the pawl under asynchronous rotation of the pawls and pawl shell and featuring a plurality of pairs of driving lugs, each pair adapted to cooperate with a pawl of the clutch and adapted to position the ring to prevent engagement of the pawls under asynchronous rotation of the pawl shell and pawl carrier.

A further object is to provide a clutch mechanism including a roller clutch of the freewheel type having a toothed outer race member interengageable by a shiftable speed selecting sleeve wherein the engagement of the sleeve and the toothed member takes place immediately above the roller race of the freewheel device.

These and other objects of my invention will become apparent from the following description taken in conjunction with the accompanying drawings wherein.

Figure 2:
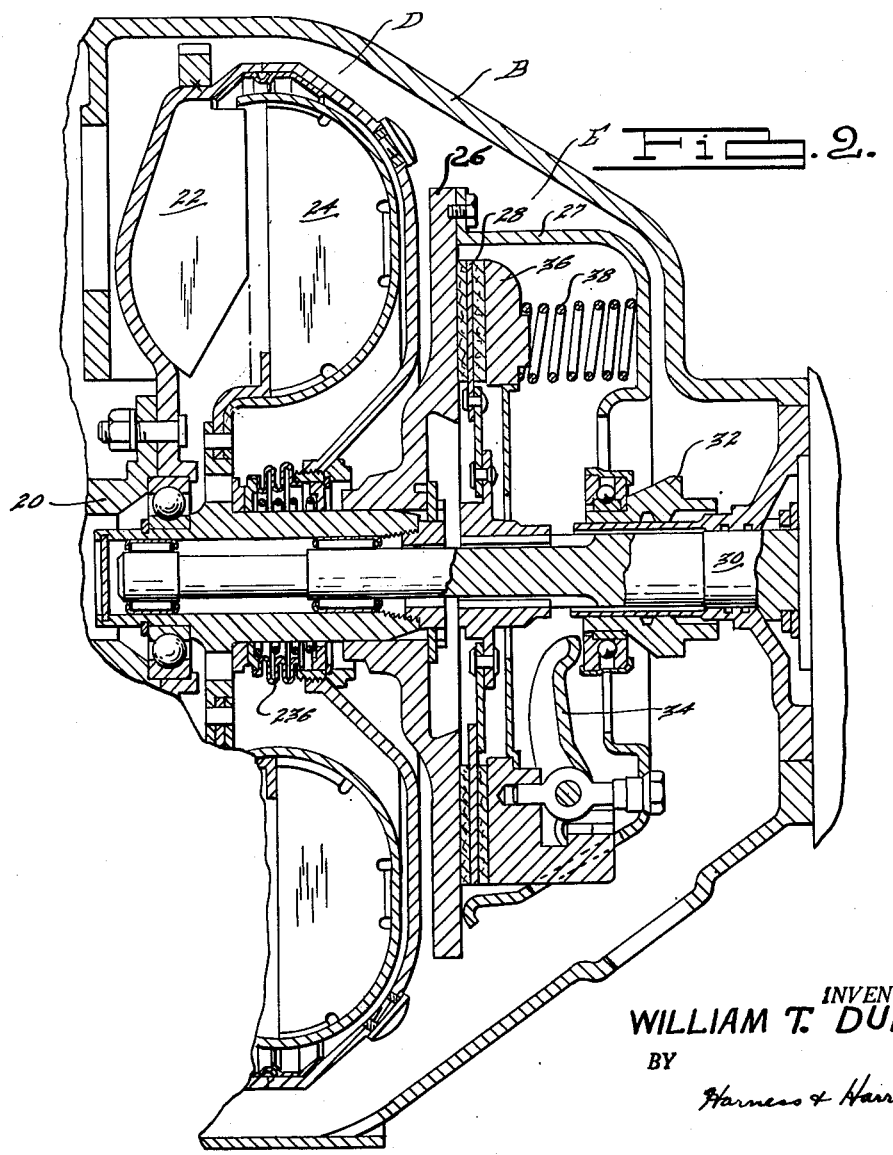
Fig. 2 is an enlarged cross sectional view of a portion of the mechanism of Fig. 1.
Figure 3:
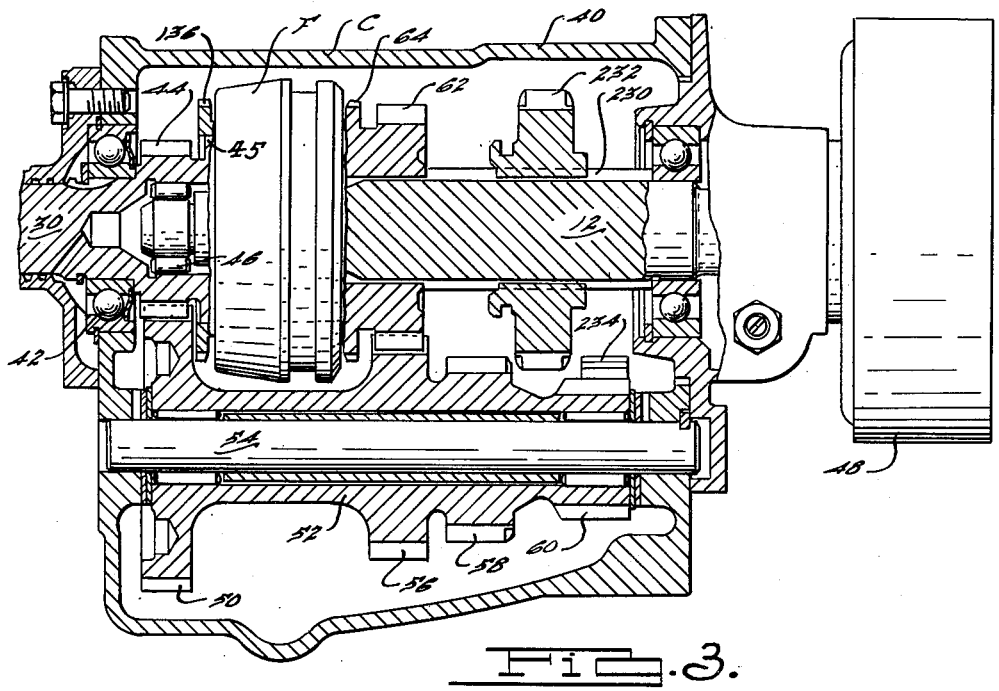
Fig. 3 is an elevational view partly in section of the change speed transmission of my invention
Figure 4:
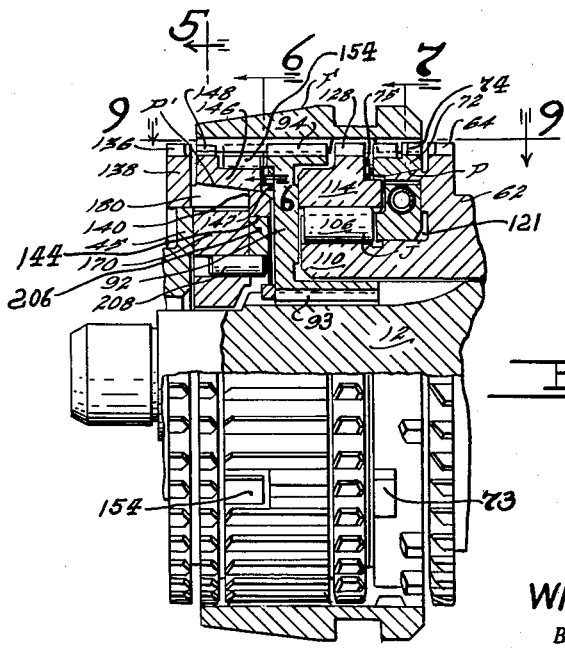

2 and which drivingly connects with the mechanism of Fig. 2;

Fig. 4 is a detailed enlarged view of the second-direct clutch mechanism of Fig. 3, the shiftable clutch sleeve being shown in neutral position, and the centrifugal clutch pawls being shown disengaged;

Fig. 5 is a sectional view taken at 5—5 of Fig. 4 showing the centrifugal pawl clutch mechanism with the pawls disengaged from the pawl shell;

Fig. 6 is a sectional view taken at 6—6 of Fig. 4 parts being broken away showing the balk ring of my invention for preventing engagement of the pawls of the centrifugal pawl clutch during asynchronous rotation of the pawl carrier and shell, the pawls being shown in disengaged position;

Fig. 7 is an enlarged cross-sectional view taken at line 7—7 of Fig. 4 of a portion of the freewheel roller clutch mechanism of my invention showing the means for resiliently urging the roller cage to effect drive between the inner and the outer elements of the freewheel device;

Fig. 8 is a similar view to that of Fig. 6 showing a modified form of the balk ring of my invention;

Fig. 9 is a development of the interengageable teeth of the Fig. 4 clutch mechanism taken at line 9—9 in Fig. 4, the teeth of the clutch sleeve being shown in neutral position; and Fig. 10 is a sectional development of the teeth of a portion of the clutch sleeve of Fig. 3 taken at line 9—9 of Fig. 4, the ends of the sleeve being illustrated by dot-dash lines.

Figure 1:
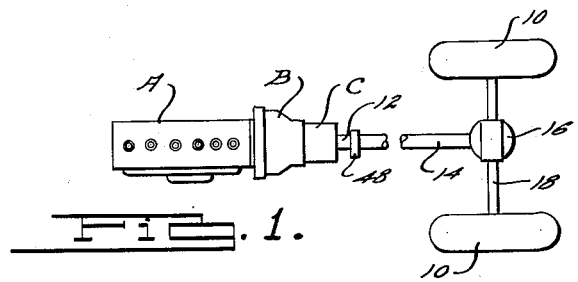
Fig. 1 is a diagrammatic showing of the power plant drive mechanism of a vehicle incorporating the present invention.

Referring now to the drawings wherein similar reference characters are used to designate corresponding parts of the structure, Fig. 1 illustrates a typical arrangement of the transmission mechanism of the present invention in a vehicle embodying the same. The vehicle engine A is coupled to the driving wheels 10 of the vehicle through a fluid power transmitting and main clutch unit B shown in greater particular in Fig. 2 and a change speed gearing C shown in detail in Figs. 3 to 9 inclusive, and comprising a three-speed forward and reverse transmission having under driver control an automatically operative direct drive ratio. As seen in Fig. 1, the output shaft 12 of the unit C is connected by means of the usual propeller shaft 14 with customary differential gear box 16 which in turn drives the axle shafts 18.

As best seen in Fig. 2, I preferably arrange for transmitting drive from the engine A to the transmission C through clutch means comprising a fluid power transmitting device such as the fluid coupling D of the kinetic type preferably in conjunction with a releasable main clutch E of conventional design to facilitate manual shifts of the clutch sleeve F in the transmission C.

The engine crankshaft 20 in Fig. 2 drives a coupling impeller 22 to circulate fluid in its vaned passages to drive the vaned runner 24 in a manner well known for fluid couplings of the type illustrated. The runner 24 drives the input member or driving plate 26 of the main clutch E which, as illustrated, is of the friction type. As shown, the driving plate 26 is drivingly connected with the runner 24 and to a clutch housing member 27. The driven member or mat 28 of the friction clutch E is fixed to the intermediate shaft 30 and is drivingly disengaged by depressing a clutch pedal, not shown, which slides the throwout 32, forwardly to operate lever 34 to unload the pressure driving plate 36, springs 38, loading this plate and engaging the clutch when the clutch pedal is released.

The shaft 30 extends rearwardly into the housing or casing 40 of the transmission C (Fig. 3) where it is rotatably supported by ball bearing 42 and is formed with a main drive pinion 44 at its inner end. Also formed on the inner end of the shaft 30 is an enlargement 45 constituting the pawl carrier or pawl core of a centrifugal clutch, more clearly illustrated in Fig. 4. The drive pinion 44 is hollow and journals by a bearing 46, the forward end of the transmission driven shaft 12 which may also carry at its opposite end a propeller shaft brake drum 48 having braking mechanism, not shown, associated therewith.

The drive pinion 44 is in constant mesh with a gear 50 for driving the countershaft cluster 52, carried for rotation on a countershaft 54 supported in the casing 40. The cluster 52 includes a second or intermediate speed pinion 56, a first or low speed pinion 58, and a reverse drive pinion 60.

The second speed pinion constantly meshes with a second speed gear 62 journalled for rotation on the shaft 12, as seen in Fig. 3. This gear has a set of integral external clutch teeth 64 adapted for interengagement with a group of internal clutch teeth generally designated by the letter G in Fig. 10 of a manually shiftable clutch member F, which is adapted to be shifted axially of the shaft 12 to various positions by a shift yoke and rail mechanism, not shown, under control of the vehicle driver, suitable stops or detents being provided to properly locate the sleeve in any given position. Engagement with the teeth 64 is effected by rearward movement of the sleeve F from its neutral position in Fig. 4. When the sleeve is so engaged, it is in the non-freewheeling or two-way second speed position of the sleeve and establishes a drive through the elements 30, 44, 50, 56, 62, F, 92, and 12. As seen in Fig. 10 the tooth group G comprises individual relatively long teeth 66 spaced apart circumferentially by sets of two relatively short teeth 67, 68, certain of these sets being omitted to provide spaces as at 69 and the rearward ends being set back axially, all for purposes hereinafter to be described.

The gear member 62 is also provided with a cone-shaped surface P on which is rotatably carried a synchronizing and blocker element or ring 72 having blocker synchronizing teeth 74 which are engageable by the teeth 67, 68 of the clutch sleeve F for blocking rearward shift of the clutch sleeve when the relative rotative speeds of the sleeve and gear 62 are asynchronous.

It will be noted that a pair of teeth 67, 68 straddle each blocker tooth 74. This relationship is maintained by an upstanding radial blocking lug 73 on the ring 72 which oscillates in the space 69 of the sleeve F formed by omitting a pair of clutch sleeve teeth 67, 68. The forward ends of the teeth 64 are sharply pointed or inclined from one side of the tooth to the other at an acute angle of approximately 36°. The rearward ends of the long teeth 66 of the group G are similarly pointed but complementary thereto so that the adjacent faces of the teeth 64 and 66 are substantially parallel to each other. The forward ends of the teeth 66 are pointed by converging faces forming an included angle approximately 110°. The forward ends of the blocker teeth 74 are similarly shaped and the rearward ends of the teeth 74 and 64 are preferably formed square with the axis of rotation of the clutch mechanism. When the lug 73 is at either limit of the slot 69, the teeth 67 or 68 will be in blocking relation to the teeth 74 of the ring upon rearward movement of the sleeve F. The synchronizing ring 72 is constantly energized in friction engagement with the cone surface P by a dished flat spring 75 such that the ring 72 will be relatively rotated by the gear 62 with respect to the sleeve F within the limits provided by the lost motion connection between the lug 73 and the slot 69. Engagement of the teeth 67, 68 with the blocker teeth 74 will increase the pressure on the cone P and effect a synchronizing action between the sleeve and the gear 62. As soon as the rotative speeds of the sleeve and gear are brought into synchronism the teeth 67, 68 will bypass the blocker teeth 74 and become engaged with the teeth 64 of the gear 62 to establish two-way second ratio drive. Although only one lug 73 and slot 69 are illustrated, a plurality may be provided. The shaping of the short teeth 67, 68 will be evident from Fig. 10, where it will be seen that the forward ends of these teeth are pointed in the manner of the teeth 66 and that the rearward ends are angled parallel to the faces of the teeth 74 and are formed with a blunted point.

The clutch sleeve F is slidably carried on a toothed hub member 92 splined to the shaft 12 as at 93. The hub 92 has external splines or teeth 94 having square ends, these teeth being spaced circumferentially to provide splineways 95 to receive the internal teeth of the clutch sleeve F generally designated by the letter H, such teeth comprising individual long teeth 96 spaced circumferentially by a pair of intervening short teeth 97, 98, the forward ends of which are set back axially from the teeth 96 for a purpose to be described. The teeth 96, 97 and 98 each have their rearward ends pointed at an acute angle relative to the axis of rotation in a manner similar to the teeth 128 but complementary thereto. The long teeth 96 have their forward ends pointed in a manner similar to the forward ends of the teeth 66 while the forward ends of the teeth 97, 98 are formed similar to the rearward ends of the teeth 67, 68. It will be observed that the teeth 96, 97, 98 are respectively axially aligned with the teeth 66, 67 and 68 respectively.

An overrunning clutch generally desigated by the letter J, Fig. 4, is arranged drivingly intermediate to the gear member 62 and the clutch sleeve F carried by the hub 92, and is adapted to be selectively drivingly connected to the sleeve F to provide a one-way driving connection between the gear 62 and the hub 92, the clutch J being adapted to drivingly connect the gear and sleeve F upon tendency of the gear 62 to rotate faster than the sleeve F in a forward direction, that is, counterclockwise, looking forwardly of Fig. 4 while permitting overrun of the clutch sleeve F relative to the gear 62 upon tendency of the clutch sleeve to rotate faster than the gear 62.

The clutch J is of the conventional roller type and is provided with rollers 106 and a cage or carrier 108 having a lost motion driving connection with the gear 62. The forward portion 110 of the gear 62 is provided with cammed surfaces 112 and forms the inner race of the device J. An outer ring or shell 114 surrounds the rollers 106 and provides a smooth run-way 116 therefor. It will be observed that the rollers 106 in Fig. 4 are substantially the full width of the outer race 114 to provide substantial support for the outer race and avoid cocking of this member during engagement of the external teeth 128 thereof with the teeth of the clutch sleeve upon forward and rear movement of the sleeve. A compression spring 118 having one end seated against a lug 120 in the undercut portion 121 of the gear 62 and its other end seated in a recess 122 of the cage 108 biases the rollers 106 in the direction of the arrow 124 in Fig. 7 into drive position, drive occurring whenever the gear 62 tends to rotate forwardly (counterclockwise in Fig. 7) faster than the ring 114.

The forward ends of the teeth 128 of the coupling ring 114 are sharply pointed in a manner similar to the rearward ends of the sleeve teeth 96 but complementary thereto and the rearward ends of the teeth 128 are provided with converging pointed ends similar to the ends of the teeth 74.

In the neutral position of the clutch sleeve F, as seen in Figs. 4 and 9, the clutch sleeve teeth are entirely disengaged from the teeth 128 and from all other teeth of the clutching mechanism with the sole exception that the teeth of the group H are engaged with the splines 94 of the hub 92.

The clutch sleeve F is also adapted to be manually shifted forwardly of the neutral position in Fig. 4 to engage the teeth of the group G of the sleeve F with the teeth 128 of the coupling ring 114 to thereby establish freewheel second speed ratio drive between the input shaft 30 and the driven shaft 12 through the elements 30, 44, 50, 56, 62, J, F, 92, and 12.

In the forward movement of the clutch sleeve F to establish this freewheel drive, the internal teeth H of the clutch sleeve are engaged with a set of clutch teeth 136 of a floating pawl engaging shell 138 which is journalled on the pawl carrier portion 45 of the drive pinion 44, this shell having a rearwardly extending hub portion 140 provided with an external conical friction surface P' which rotatably supports a blocker synchronizing ring 146 having an internal conical surface complementary to the conical surface P', the conical surfaces being urged into engagement by a spring ring 147 to effect rotation of the ring 146 with the shell 138.

The ring 146 has blocker synchronizing teeth 148 which are similar in form to the blocker teeth 74 of the ring 72 and also has an external radially directed lug 154 which projects into a slot 156 in the forward rim portion of the hub 92 to provide a lost motion connection therewith. It will be noted that the teeth 136 of the shell 138 are shaped at their rearward ends in a manner similar to the rearward ends of the teeth 128 of the coupling ring 114.

The enlarged portion 45 of the drive pinion 44 serves as a carrier for the pawls 170 of a centrifugal clutch of which the shell 138 is the driven portion. As seen in Fig. 5, the portion 45 is provided with pawl guides 172, 174 which have arcuate faces 176, 178 serving to journal the overlying hub portion 140 of the pawl shell 138. Slidably mounted between the guides 172, 174 are a pair of radially movable pawls 170 which are adapted for outward movement oppositely to one another to engage slots, openings, or windows 180 provided in the floating shell 138, to establish a two-way direct drive between the shafts 12 and 30 when the teeth H of the clutch sleeve F are engaged with the clutch teeth 136 of the shell. Preferably, a plurality of pawl-receiving windows are provided. The number of windows is also preferably a multiple of the number of pawls, four windows spaced 90° apart circumferentially, being shown in Fig. 5. Each of the pawls has faces 182, 184 on the tail and head portions thereof respectively, in sliding engagement with faces 186, 188 respectively, of the pawl carrier. The pawls 170 are oppositely disposed relative to one another so that the face 190 of the head portion of the pawl opposite to the face 184 thereof, slidably engages the face 192 of the tail portion opposite the face 182 of the latter.

In order to keep the pawls disengaged as in Fig. 5, below a predetermined speed of rotation of the pawl carrier 45, a radially inwardly acting bias is applied to the pawls to oppose their centrifugal tendencies in the speed range in which disengagement is desired. For this purpose control or governor means comprising compression springs 194 are provided in recesses 196 of the carrier portions 174 and engage lateral finger portions 200 of the pawls 170 to urge the pawls inwardly. Adjustment of the engaging speed of the pawls may be made either by replacing the springs with new ones of different force values or by means of adjustment screws (not shown).

The pawl windows 180 are preferably arranged such that diametrically opposite windows will simultaneously register with the pawls 170 so as to receive the pawls under the conditions hereinafter described.

The pawls 170 are slightly rounded or chamfered at their outer leading portions 201 to minimize any slight ratcheting occurring during any relative rotation of the carrier 45 and the shell 138 when the pawls are free to engage. Outward pawl movement following engagement is limited by engagement of the yoke portion 202 thereof with the inner surface 204 of the portion 174 of the pawl carrier.

A feature of the invention is to provide means for preventing or blocking engagement of the pawl during rotation thereof above their engaging speed under drive or coast operation conditions when the relative rotative speed of the pawl shell 138 and the pawl carrier are asynchronous. For this purpose I provide a split blocker or balk ring 206 which as seen in Fig. 6 has a continuous circumferential surface interrupted by a slot 207, and is of such section and formation as to have a slight outward spring effect when assembled in a mating bore 144 of the shell 138 so as to have a friction fit with said bore. Consequently, under certain conditions hereinafter referred to, a friction drive in the same relative direction of rotation as the shell 138 will be impressed upon the ring 206.

The right hand pawl 170 in Fig. 5 is provided with a pin 208 and the left hand pawl with a pin 208A. These pins are rigidly fixed in the side faces of the pawls and, as seen in Fig. 4, project rearwardly through the plane of the balk ring 206.

During asynchronous rotation of the pawls and shell 138, these pins lie in the path of driving lugs 210, 212, and 210A, 212A which project radially inwardly of the ring 206 and are at the same radial distance as the pins 208, 208A when the pawls are disengaged so as to adapt them for engagement with the pins. Adjacent one side of the lug 210 is a peripheral land 214 forming a recess 215 with the lug 210. The pawl pin 208 will engage with the lug 210 to block engaging movement of the pawl when there is asynchronous rotation between the pawl carrier and shell and the shell rotatably leads the pawl, as under vehicle coast conditions. The lug 210A has a similar land 216 and recess 217 for receiving the pin 208 under drive conditions of operation when the relative speeds of the pawl carrier and shell are asynchronous such that the pawls rotatably lead the shell. The lug 212A in Fig. 6 is diametrically opposite the lug 210A and has a land 216A and recess 217A similar to that adjacent the lug 210A for receiving the pawl pin 208A under drive conditions for blocking outward movement of its pawl. Similarly, the lug 212 which is diametrically opposite the lug 210 has a land 214A and recess 215A similar to that adjacent the lug 210 for receiving the pawl pin 208A and blocking outward movement of this pawl under coast conditions. Between the lands 214 and 216 is a recess 224 into which the pawl pin 208 may enter when the relative speeds of the pawl shell and carrier are synchronous and incidental to engagement of its pawl 170 with a pawl window 180. As seen in Fig. 6 the internal recess 224 is at a greater radial distance than the lands 214, 216 and the bottom of such recess 224 forms a land 225 which may serve as a limit stop for the outward radial movement of the pawl pin 208. A similar recess 224A and land 225A are provided between the lands 214A and 216A.

As will be evident from the foregoing description when the pawls are in disengaged position, the pin 208 will become engaged with one or the other of the driving lugs 210, 210A and the pawl pin 208A with one or the other of the driving lugs 212, 212A depending upon whether drive or coast conditions prevail in the transmission. For example, if the vehicle is being driven in freewheel second speed drive, the pawls 170 will be rotating about the clutch axis at a speed faster than the shell 138 which is being then driven with the hub 92 through the sleeve F, and the friction drag of the shell upon the balk ring will retard forward rotation of the ring with the pawl carrier 45 until the pin 208 engages the lug 210A and the pin 208A engages the lug 212A following which the balk ring will be driven by the pins through the lugs 210A and 212A respectively. The position of the pins 208, 208A will then be as seen in the dotted line in Fig. 6. If the pawl carrier be decelerated while the pawls are above engaging speed, the balk ring will tend to rotate with the shell 138 by reason of the friction drive connection therewith and relative rotation will occur between the driving lugs 210A and 212A and the respective pawl pins 208, 208A in a direction causing the lugs to rotatably lead the pins. The pins 208, 208A will thereupon slide off their respective lands 216, 216A and become aligned radially with the recesses 224, 224A respectively, into which the pawl pins may then enter should at any time the pawls be radially aligned with their shell windows so as to enter the same. With the pawls engaged with the shell 138 a direct drive will be established between the drive gear 44 or shaft 30 and the driven shaft 12 of the transmission through the pawls 170, shell 138, sleeve F, and hub 92.

Under coast torque conditions in freewheel second speed drive, the shaft 12 will become the driver and the tendency will be for the balk ring 206 to rotatably lead the pawl carrier 45 such that the driving lug 210 will now engage the pin 208 and the lug 212, the pin 208A. The balk ring will slip relative to the shell 138 by reason of the resistance offered by the pins 208, 208A to further rotation of the ring with the shell. In this situation the pins 208 and 208A will assume a position shown by the full lines of the pins 208, 208A in Fig. 6. Upon speeding up of the pawl carrier such that torque reversal occurs, or stated otherwise, the relative speeds of the carrier and shell become synchronized and cross each other, the pawl pins 208, 208A will rotatably lead the balk ring and the pins will slide off the lands 214, 214A and become aligned with the recesses 224, 224A entering these recesses when the pawls become engaged with the shell windows 180.

So long as the pawl pins 208, 208A are engaged with the lands 216, 216A or 214, 214A of the balk ring, the pawls will be blocked from engagement and will be held in such relationship radially with respect to the inner peripheral surface 226 of the pawl shell such that the outer radial ends of the pawls will not ride on such surface. Consequently, ratcheting of the pawls and resultant wear will be avoided.

When the speed of the pawl carrier drops below the pawl engaging speed such that the pawls are released from engagement with the pawl windows, the pawl pins 208, 208A will again assume one of the positions relative to the balk ring driving lugs described above.

Rearwardly of the gear 62, the shaft 12 is provided with a spiral splined portion 230 on which is slidable a low reverse gear 232, this member being shown in its neutral position in Fig. 3. The gear 232 may be shifted forwardly or rearwardly of its neutral position by conventional yoke and rail mechanism (not shown) under driver control. When shifted forwardly, the gear becomes engaged with the low speed gear 58 to establish the low or first speed ratio drive between the shafts 30 and 12, the drive being through the elements 30, 44, 50, 58, 232, and 12. When shifted rearwardly, the gear 232 becomes engaged with an idler gear 234 that is constantly in mesh with the reverse gear 60 thus establishing a reverse drive between the shafts 30 and 12 through the elements 44, 50, 60, 234, 232. It will be understood that when shifting the gear 232, the clutch sleeve F will be locked in neutral position.

In describing the operation of the transmission, let it be assumed that the clutch sleeve F and the low reverse gear 232 are both in neutral position, the main or friction clutch E engaged, and the engine idling. Under these conditions the impeller 22 of the fluid coupling D will rotate at engine speed. There will be very little slip in the coupling at this time due to the drag of the coupling seal 236 in Fig. 2 between the impeller and runner and the light load imposed on the coupling by the freewheel clutch J, pawl carrier 45 and countershaft parts. The pawl carrier and pawls will rotate at a speed slightly under engine speed which is preferably insufficient to effect centrifugal movement of the pawls against the bias of the control springs 194. The pawls will not overrun the pawl windows of the shell because outward movement of the pawls is stopped by the blocker ring 206. Moreover, no drive will occur between the gear 62 and clutch sleeve F since the clutch teeth 128 of the outer race 114 of the freewheel device J are disengaged from the clutch sleeve teeth G as seen in Figs. 4 and 9 and are rotating freely relative thereto.

To obtain forward movement of the vehicle, the driver will release the main clutch E so as to remove the drag torque on the teeth 128 of the freewheel outer race and simultaneously will shift the clutch sleeve F forwardly to engage the clutch sleeve teeth H with the teeth 136 of the drive pinion 44 and the teeth G of the clutch sleeve with the teeth 128 of the freewheel outer race to drivingly connect the latter with the sleeve F. Since the pawl shell 138 is at this time a floating member, no difficulty will be encountered in engaging the teeth 136 of this member with the teeth H of the clutch sleeve. When forward movement of the sleeve is complete, the driver will re-engage the main clutch E and depress the accelerator pedal 238 to speed up the engine whereupon the vehicle will be driven forwardly in freewheel second speed ratio drive, referred to above, through the gear train comprising the shaft 30, the pinion 44, gear 50, pinion 56, gear 62, freewheel device J, sleeve F, hub 92, and shaft 12. This is the starting or breakaway drive ratio.

The vehicle may now be accelerated in this speed ratio drive, the various elements including the pawl carrier 45 being speeded up as the engine speed is increased by further throttle opening movement of the accelerator.

At some predetermined vehicle speed, for example, between 13 to 16 M. P. H. the pawls will overcome the biasing effect of the control springs 194 and will move radially outwardly under centrifugal force in an effort to engage the pawl shell 138. However, at this time the pawl shell which is being driven by the gear 62 through the clutch sleeve F, is rotating at a slower speed than the drive pinion 44 and pawl carrier 45. Therefore, the pawl pin 208 will engage the lug 210A of the balk ring 206 and the pin 208A will engage the lug 212A of the balk ring and cause the ring to rotate with the carrier. Under these conditions, outward movement of the pawls will be blocked by the lands 216, 216A respectively, of the balk ring and the pawls will thus be prevented from engaging the shell and rubbing against the inner surface 226 thereof. When the driver wishes direct speed ratio drive to be established, he merely releases the accelerator pedal which in turn closes the throttle to decelerate the engine whereupon the runner 24 and pawl carrier 45 will slow down relative to the pawl shell 138 effecting a relative movement between the pawl pins and balk ring whereby the pins will move off the blocking lands as heretofore described, and enter the recesses 224, 224A. The friction connection between the shell and balk ring facilitates this result, engagement of the pawls taking place when the rotative speed of the carrier and pawl shell are synchronized, the pawl windows aligned with the pawls and the pawl pins aligned with the recesses 224, 224A, all as previously described.

Upon depression of the accelerator pedal to again speed up the engine, the transmission of torque will be resumed and direct drive will be established in the transmission through the shaft 30, pawl carrier 45, pawl 170, shell 138, clutch sleeve F, hub 92, and shaft 12. This is a two-way drive. It will be understood that engagement of the pawls will be cushioned by the fluid coupling and master clutch which will absorb any shock occurring upon making this engagement and will minimize any vibration and noise.

With the clutch sleeve F engaged with the clutch teeth 136 in direct drive, the outer race 114 of the freewheel device J will rotate at the speed of the drive pinion 44 which is higher than the speed of the second speed gear 62 and hence will overrun the gear 62.

The pawl clutch will remain engaged and the vehicle will be driven in direct drive until the speed of the pawl carrier 45 falls below a predetermined speed of rotation, for example, corresponding to a car speed between 10 and 13 M. P. H. in direct drive whereupon the springs 194 may effect release of the pawls 170 so that second speed ratio drive through the freewheel device J may be assumed automatically upon release of the clutch sleeve F from engagement with the clutch teeth 136 of the drive pinion 44.

It is sometimes desirable, for instance, when coasting down a hill in direct drive or freewheel second drive ratio to obtain engine braking in second speed ratio. With the present transmission, this is accomplished by releasing the main clutch E and shifting the clutch sleeve F rearwardly through the neutral position to engage the teeth G of the clutch sleeve with the clutch teeth 64 of the second speed gear 62 to establish two-way second speed ratio drive through the shaft 30, pinion 44, gear 50, pinion 56, gear 62, clutch sleeve F, hub 92, and shaft 12. In making this drive change, the teeth G of the clutch sleeve F will first become disengaged from the teeth 128 of the outer race of the freewheel device J to release the latter member from drive connection with the clutch sleeve. Further rearward movement of the clutch sleeve will cause the faces of the clutch sleeve teeth 67 to abut the faces of the teeth 74 of the blocker ring 72 which under the coast conditions described, rotatably lag behind the clutch sleeve which is drivingly connected to the shaft 12. The faces of such teeth are in position for abutment due to clocking of the ring 72 to the limit of the oscillatory movement permitted by the lug 73 of the blocker ring which moves to one end of the clocking slot 69 in the clutch sleeve F. Continued pressure applied on the blocker synchronizing ring by the shift sleeve F will cause the second speed gear 62 to be synchronized through the cone connection P with the driven shaft 12, that is, the second speed gear 62 will be speeded up through the blocker synchronizing action to that of the shaft 12 so that the clutch sleeve teeth 67 may shift by the blocker teeth 74 and the teeth 66 may enter between the teeth 64 of the second speed gear to establish two-way or non-freewheeling second speed ratio drive. Upon completion of the shift, the main clutch will be engaged and drive of the vehicle in this gear may be obtained.

It will be noted that as the teeth 67 of the clutch sleeve slip by the blocker teeth 74, the teeth H of the clutch sleeve the ends of which have single-sided chamfering opposite to that of the teeth 66 will move to engage the forward ends of the teeth 128 of the outer race of the freewheel device in a manner to urge the outer race 114 in a releasing direction, that is, counterclockwise looking forwardly in Fig. 4 so as to prevent the freewheel device from becoming locked up and cause dead-ending of the teeth 66 with respect to the teeth 64.

Should a shift from freewheel-second drive to two-way second drive be desired while the shaft 12 is undergoing drive torque, a similar manipulation of the shift sleeve to that described above will be made following release of the main clutch E.

Should a shift from neutral to two-way second drive be desired, a similar rearward manipulation of the clutch sleeve to that described above will be made following release of the main clutch E. At this time the blocker ring 72 through its friction engagement at the cone P with the second speed gear 62 will rotatably lead the clutch sleeve such that the faces of the teeth 68 of the clutch sleeve will abut the faces of the blocker teeth 74 of the blocker synchronizing ring until the speed of the sleeve and second speed gear 62 are synchronized when engagement may be made.

Shift from two-way second speed ratio drive to freewheel drive in this ratio may be obtained providing the pawls 170 are disengaged by releasing the accelerator pedal, preferably declutching, to obtain removal of driving torque on the teeth G, whereupon a forward shift of the clutch sleeve F will disengage these teeth and disengage the sleeve teeth H and teeth 128 of the freewheel outer race which up to this time has been driven at the same speed as the clutch sleeve F and gear 62. The teeth 128 will now be engaged by the sleeve teeth G which are rotating at least as fast as the teeth 128 to effect a freewheel shift. Since the pawl shell 138 is at this time a floating member, no difficulty will be encountered in synchronizing this member with the sleeve and causing the teeth 96 and 97 of the clutch sleeve to successively become engaged with the teeth 136 of the shell.

When downshifting from direct drive to two-way second, the pawls 170 will remain in engagement with the pawl shell 138 so long as the rotative speed of the pawls and carrier are sufficiently high. Consequently, if it is desired to upshift from two-way second to direct while the vehicle is going downhill to obtain engine braking in a lower numerical ratio it is merely necessary for the driver to release the accelerator pedal, disengage the main clutch E and shift the sleeve F into engagement with the teeth 136 of the shell. This is a synchronized shift. The teeth 148 of the blocker synchronizing ring 146 will rotatably lead the teeth of the clutch sleeve to the extent of the lost motion driving connection provided by the lug 154 between the blocker ring and hub, the shaft 30 rotating faster than the shaft 12 at the moment of shift. The forward end faces of the teeth 98 of the clutch sleeve will abut the faces of the teeth 148 of the blocker ring and continued pressure applied through these teeth to the conical surface P' between the blocker ring and pawl shell will cause the shell to be brought down to the speed of the driven shaft 12 at which time the teeth 98 may pass by the blocker teeth 148 and permit the longer teeth 96 of the sleeve to become engaged with the clutch teeth 136 of the pawl shell to establish two-way direct drive upon subsequent re-engagement of the main clutch E.

Shifts from neutral into first speed or reverse by means of the shiftable gear 232 have been described above. It is to be noted that in these drives the pawls are generally blocked, but if they should engage, shell 138 is a loose piece and no damage would result. If a shift from low speed to two-way second is desired the main clutch E will be released and the manual selector will be moved through the neutral position to restore the sliding gear 232 to neutral position and the clutch sleeve F will then be shifted rearwardly to engage the clutch teeth 64. Since the drive is from a slower to a faster gear, it will be necessary to slow down the second speed gear 62 to the speed of the shaft 12. As the sleeve F is shifted rearwardly, the teeth 68 will abut the teeth 74 of the ring 72 and continued pressure applied rearwardly by the shift sleeve F will cause the gear 62 to be slowed down to the speed of the shaft 12. When the parts are synchronized, the teeth 68 will disengage from the teeth 74 and the teeth 66 may enter between the clutch teeth 64 to establish the two-way second speed ratio drive.

Fig. 8 shows a modification of the balk ring structure of Fig. 6 wherein the lugs 210B and 212C corresponding respectively to the lugs and 212A and 210 of Fig. 6 have been separated a greater distance circumferentially so as to facilitate engagement of the pawls 170 with the windows 180 of the shell from any relation condition of these members when the speeds thereof have been synchronized. The lugs 210C and 212B corresponding respectively to the lugs 212 and 212A of Fig. 6 have been similarly separated circumferentially. The functioning of the balk ring in this modification is the same as that described above with respect to Fig. 6.

From the above description, it will be seen that I have provided a novel transmission of semi-automatic character particularly useful for low-priced cars that has a novel clutching mechanism including a centrifugal pawl clutch provided with balking means for preventing ratcheting of the pawls and which mechanism is adapted to provide all necessary and desirable driving functions. Although the particular structure shown and described above is well adapted for carrying out the various objects of my invention, it will be understood that various modifications, changes and substitutions may be made without departing from the spirit thereof. The subject invention, is therefore, to be construed to include all such modifications, changes, and substitutions as may come within the scope of the following claims.

I claim:

1. Transmission mechanism comprising coaxial drive and driven shafts, means for drivingly connecting said shafts comprising a hub rotatable with said driven shaft, a pawl carrying core and a gear rotatable with said drive shaft, a second gear freely rotatable on said driven shaft, said gear having an extension in the direction of said hub providing the driving race of a one-way roller coupling, said coupling having an inverted T-shaped driven race radially aligned with the driving race and radially spaced therefrom by a plurality of rollers, the leg of said driven race having a toothed periphery and the said rollers having a length substantially coextensive with said driven race, an axially fixed windowed shell journalled on said core and in tandem with said hub, said shell having peripheral teeth at its end remote from said hub, a movable pawl on said core adapted to be projected from a disengaged position relative to said shell to engage in a window in said shell, a toothed sleeve surrounding said shell and rotatable with and axially movable on said hub said sleeve being adapted to drivingly connect said shell and driven race when engaged with the teeth of both thereof, other gears drivingly connecting said first mentioned gears, and a blocking element frictionally journalled on said shell and adapted to prevent engagement of said pawl with said shell window when the relative speeds of said shafts are asynchronous.

2. Transmission mechanism comprising coaxial drive and driven shafts, and means for drivingly connecting said shafts comprising a pawl carrying core rotatable with said drive shaft, a hub member in tandem with said core and splined to said driven shaft, an axially fixed windowed shell surrounding said core and journalled thereon for relative rotation with respect thereto, said shell being axially juxtaposed, said hub and said shell having peripheral teeth opposite its end most remote from said hub, a centrifugally operable pawl movably mounted on said core and adapted to be projected into engagement with a window of said shell to drivingly connect said core and shell, a toothed clutch sleeve splined to said hub and surrounding the windowed portion of said shell, said sleeve being movable to have its teeth interengaged with the teeth of said shell to drivingly connect said hub and shell, first blocker means operably positioned between said pawl and said shell, and second blocker means operably positioned intermediate the teeth of said sleeve and the teeth of said shell and surrounding the windowed portion of said shell; said windowed shell and peripheral teeth thereof, said pawl, pawl carrying core and said second blocker means being all contained within the axial length of said sleeve when the latter is engaged with the teeth of said shell.

3. Transmission mechanism comprising coaxial drive and driven shafts, and means for drivingly connecting said shafts comprising a gear rotatable with said drive shaft, a pawl carrying core carried by said gear, a hub member in tandem with said core and rotatable with said driven shaft, a second gear freely rotatable on said driven shaft, said gear having an extension in the direction of said hub member providing the driving raceway of a one-way roller coupling, countershaft gearing drivingly connecting the aforesaid gears, a driven raceway surrounding the driving raceway of said coupling, a plurality of circumferentially spaced rollers radially intermediate said raceways, said driven raceway having an outer toothed periphery in radial alignment with said rollers, an axially fixed windowed shell journalled on said core and juxtaposed said hub member, said shell having opposite ends and having peripheral teeth at the end most remote from said hub member, a movable pawl slidably mounted on said core and adapted to be projected from a disengaged position relative to said shell to an engaged position therewith wherein the pawl is engaged in a window of said shell, a toothed clutch sleeve splined to said hub and axially movable relative thereto, said sleeve surrounding the windowed portion of said shell and being operable to have its teeth contemporaneously engaged with the peripheral teeth of both said shell and said driven raceway, blocker means operably intermediate said pawl and shell and frictionally journalled by said shell and further blocker means operably intermediate the teeth of said sleeve and the teeth of said shell and surrounding and frictionally carried by the windowed portion of said shell; said windowed shell and peripheral teeth thereof, said pawl, said pawl carrying core, and said further blocker means being all contained within the axial length of said sleeve when the latter is engaged with the teeth of said shell.

4. Transmission mechanism comprising coaxial drive and driven shafts, and means for drivingly connecting said shafts comprising a gear rotatable with said drive shaft, a pawl carrying core carried by said gear, a hub member in tandem with said core and rotatable with said driven shaft, a second gear freely rotatable on said driven shaft, said gear having a set of clutch teeth and having an extension in the direction of said hub member providing the driving raceway of a one-way roller coupling, countershaft gearing drivingly connecting the aforesaid gears, a driven raceway surrounding the driving raceway of said coupling, a plurality of circumferentially spaced rollers radially intermediate said raceways, said driven raceway having an outer toothed periphery in radial alignment with said rollers, an axially fixed windowed shell journalled on said core and juxtaposed said hub member, said shell having opposite ends and having peripheral teeth at its end most remote from said hub member, a movable pawl slidably mounted on said core and adapted to be projected from a disengaged position relative to said shell to an engaged position therewith wherein the pawl is engaged in a window of said shell, and a toothed clutch sleeve splined to said hub and axially movable relative thereto, said sleeve surrounding the windowed portion of said shell and said sleeve having two axially spaced sets of teeth, one set being engageable with the teeth of said shell and the other with the teeth of said driven race when the sleeve is moved in one direction from a neutral position disengaged from either thereof whereby to establish a drive through said one-way coupling when said pawl is disengaged from said shell or a drive between said hub and said shell when said pawl is engaged with said shell and said one set of teeth being engageable with the teeth of said driven race and the other set with the clutch teeth of said second gear when said sleeve is moved in an opposite direction from said neutral position whereby to neutralize said one-way coupling and establish a two-way drive between said second gear and said hub.

5. Transmission mechanism comprising coaxial drive and driven shafts, and means for drivingly connecting said shafts comprising a gear rotatable with said drive shaft, a pawl carrying core carried by said gear, a hub member in tandem with said core and rotatable with said driven shaft, a second gear freely rotatable on said driven shaft, said gear having a set of clutch teeth and having an extension in the direction of said hub member providing the driving raceway of a one-way roller coupling, countershaft gearing drivingly connecting the aforesaid gears, a driven raceway surrounding the driving raceway of said coupling, a plurality of circumferentially spaced rollers radially intermediate said raceways, said driven raceway having an outer toothed periphery in radial alignment with said rollers, an axially fixed window shell journalled on said core and juxtaposed said hub member, said shell having opposite ends and having peripheral teeth at its end most remote from said hub member, a movable pawl slidably mounted on said core and adapted to be projected from a disengaged position relative to said shell to an engaged position therewith wherein the pawl is engaged in a window of said shell, a toothed clutch sleeve splined to said hub and axially movable relative thereto, blocker means operably intermediate said pawl and shell and frictionally journalled by said shell, and further blocker means operably intermediate the teeth of said sleeve and the teeth of said shell and surrounding and frictionally carried by the windowed portion of said shell, said sleeve surrounding the windowed portion of said shell and said sleeve having two axially spaced sets of pointed teeth, one set being engageable with the teeth of said shell and the other with the teeth of said driven race when the sleeve is moved in one direction from a neutral position disengaged from either thereof whereby to establish a drive through said one-way coupling when said pawl is disengaged from said shell or a drive between said hub and said shell when said pawl is engaged with said shell and said one set of teeth being engageable with the teeth of said driven race and the other set with the clutch teeth of said second gear when said sleeve is moved in an opposite direction from said neutral position whereby to neutralize said one-way coupling and establish a two-way drive between said second gear and said hub and the adjacent ends of said one set of teeth and the teeth of said driven race, engageable when shifting said sleeve to establish said two-way drive, having complementary chamfered faces for facilitating neutralization of said coupling.

6. Transmission mechanism comprising drive and driven shafts, means for drivingly connecting said shafts including a pair of relatively rotatable structures at least one of which is adapted for rotational change from one direction to the opposite direction relative to any point on the other of said structures; one of said structures comprising a portion drivingly connected to one of said shafts which portion carries a pawl adapted to be projected from a disengaging position into an engaging position, said pawl having a lateral projection thereon; the other of said structures comprising an annular member journalled on said pawl carrying portion and axially fixed relative thereto, a hub in tandem with said member and drivingly connected to the other of said shafts, and a toothed clutch sleeve surrounding said member and hub, said member having teeth at the end thereof most remote from said hub and the teeth of said sleeve being movable into engagement with the teeth of said member for drivingly connecting said member and hub, said member also having a pawl window adapted to be engaged by said pawl when the same is projected into engaging position to lock said structures together against relative rotation, a latching element having a frictional drive connection with said member, said element being engageable with said pawl projection, said element when so engaged preventing projection of the pawl into engaging position and being movable to release the pawl for projection into engaging position in response to a change in direction of relative rotation of said structures, and a blocker for said sleeve carried by said member and arranged in radial alignment with said pawl window; said annular pawl engaging member and teeth thereof, said pawl and pawl carrying portion, said blocker and said latching element being all contained within the axial length of said sleeve when the latter is engaged with the teeth of said annular member.

7. Transmission mechanism comprising drive and driven shafts, means for drivingly connecting said shafts including a pair of relatively rotatable structures at least one of which is adapted for rotational change from one direction to the opposite direction relative to any point on the other of said structures, one of said structures being drivingly connected to one of said shafts and comprising a portion carrying a pawl adapted to be projected from a disengaging position into an engaging position, said pawl having a pin, the other of said structures comprising an annular member journalled on said pawl carrying portion and axially fixed relative thereto, a hub in tandem with said member and drivingly connected to the other of said shafts, and a toothed clutch sleeve surrounding said member and hub, said member having teeth at the end thereof most remote from said hub and the teeth of said sleeve being movable into engagement with the teeth of said member for drivingly connecting said member and hub, said member also having a slot adapted to be engaged by said pawl when the latter is projected into engaging position to lock said structures together against relative rotation when said hub and member are drivingly connected, a latching element supported by said member and having a frictional drive connection therewith, said element being engageable with said pin, said element when so engaged preventing projection of the pawl into said engaging position and being movable to release the pawl for projection into engaging position in response to change in direction of relative rotation of said structures, and a blocker for said sleeve carried by said member and arranged in radial alignment with said pawl engaging slot; said slotted annular pawl engaging member and teeth thereof, said pawl, pawl carrying portion, said blocker and said latching element being all contained within the axial length of said sleeve when the latter is engaged with the teeth of said annular member.

8. Transmission mechanism comprising drive and driven shafts, and a centrifugally actuated clutch for drivingly connecting said shafts, said clutch having a pawl carrying portion rotatable with one of said shafts, a pawl on said portion adapted to be projected outwardly from a disengaging position to an engaging position, a laterally extending finger carried by said pawl, an axially fixed rotatable shell journalled on said pawl carrying portion and having a slot for receiving said pawl, a hub in tandem with said shell and rotatable with the other of said shafts, a slidable toothed sleeve surrounding said shell and slidable to interengage with teeth on said shell to drivingly connect said shell and hub, the teeth of said shell being located on the end of said shell most remote from said hub, a blocking element for preventing engagement of said pawl and shell, said element having a lug for rotational engagement with said finger, a blocking land adjacent said finger for engaging said finger to prevent outward movement of said pawl, a recess adjacent said land for receiving said finger upon engaging movement of said pawl and a toothed blocker for said sleeve carried by said shell and arranged in radial alignment with said slot; said shell and teeth thereof, said pawl, pawl carrying portion, said toothed blocker and said pawl blocking element being all contained within the axial length of said sleeve when the latter is engaged with the teeth of said shell.

9. Transmission mechanism comprising drive and driven shafts, a pawl carrying core drivingly associated with one of said shafts, an axially fixed windowed shell journalled on said core, a hub in tandem with said shell and drivingly associated with the other of said shafts, a toothed sleeve surrounding said shell and slidable to interengage with teeth on said shell to drivingly connect said shell and hub, the said teeth being located at the end of said shell most remote from said hub, a movable pawl on said core adapted to be projected from a disengaged position relative to said shell to engage in a window in said shell, a split ring carried by said core and having a frictional driving connection with said shell, a lateral pin on said pawl, a lug on said ring for engagement with said pin to establish a rotational driving relationship between said pawl and ring, a blocking land adjacent said lug for engaging said pin to restrain projection of said pawl to engaging position, a recess adjacent said land for receiving said pawl pin when said pawl is aligned with said shell window to facilitate engagement of said pawl and a toothed blocker for said sleeve carried by said shell and arranged in radial alignment with said shell window; said windowed shell and teeth thereof, said pawl, pawl carrying core, said toothed blocker, and said split ring being all contained within the axial length of said sleeve when the latter is engaged with the teeth of said shell.

10. Transmission mechanism comprising drive and driven shafts, a pair of relatively rotatable structures one associated with said drive shaft, the other associated with said driven shaft and comprising an axially fixed rotatable shell journalled on said driving shaft structure, a hub in tandem with said shell and splined on said driven shaft, a movable sleeve surrounding said shell and splined on said hub, said sleeve having teeth interengageable with teeth on said shell, the latter teeth being located on the end of said shell most remote from said hub, said shell having a slot therein, a pawl carried by a portion of said one structure and adapted to be projected from a disengaged position into an engaging position relative to said slot to lock said structures against relative rotation when said sleeve is also engaged, a lateral projection on said pawl, a split ring having frictional drive engagement with said shell, a lug on said ring for drive engagement with said pawl projection when relative rotational tendency exists between said pawl and shell, a blocking land on said ring for engaging said pawl projections when the latter is also engaged with said lug, a recess on said ring adjacent said land adapted to receive said pawl projection in response to a relative directional change of rotation of said pawl and shell to permit said pawl to enter the slot of said shell, and a toothed blocker carried by said shell and arranged in radial alignment with said shell slot; said slotted shell and teeth thereof, said pawl, pawl carrying portion, said toothed blocker and said ring being all contained within the axial length of said sleeve when the latter is engaged with the teeth of said shell.

11. Transmission mechanism comprising drive and driven shafts, a pair of relatively rotatable structures, one associated with said drive shaft, the other associated with said driven shaft and comprising an axially fixed rotatable shell journalled on said driving shaft structure, a hub in tandem with said shell and drivingly connected to said driven shaft, a movable sleeve surrounding said shell and splined on said hub, said sleeve having teeth interengageable with teeth on said shell, the latter teeth being located on the end of said shell most remote from said hub, said shell having a slot therein; a pawl carried by said driving shaft structure and adapted to be projected from a disengaged position into an engaging position relative to said slot to lock said structures against relative rotation when said sleeve is also engaged; a lateral projection on said pawl; a split ring having frictional engagement with said shell; a pair of spaced lugs of said ring for drive engagement with said pawl projection when relative rotational tendency exists between said pawl and shell, one of said lugs being engageable with said pawl projection when the pawl rotatably tends to lead the shell, the other lug being engageable with said pawl projection when the shell rotatably tends to lead the pawl; a blocker land on said ring adjacent each of said lugs for engaging said pawl projection when also engaged with its respective lug to prevent projection of said pawl into engaging position; a recess on said ring adjacent said lands adapted to receive said pawl projection in response to a relative directional change of rotation of said pawl and shell whereby the pawl projection leaves the land with which it is engaged and enters said recess to thereby permit engagement of said pawl in the slot of said shell; and a blocker carried by said shell and arranged in radial alignment with said shell slot; said shell and teeth thereof, said pawl, pawl carrying structure, said blocker and said ring being all contained within the axial length of said sleeve when the latter is engaged with the teeth of said shell.

12. Transmission mechanism as claimed in claim 11 wherein the said lands are intermediate said lugs on the side of said lugs wherein the lugs are the smallest distance apart measured circumferentially of said ring and wherein said recess comprises a single recess intermediate said lands and connecting the same.

13. Transmission mechanism comprising drive and driven shafts, a pair of relatively rotatable structures, one associated with said drive shaft, the other associated with said driven shaft and comprising an axially fixed rotatable shell journalled on said driving shaft structure, a hub in tandem with said shell and splined on said driven shaft, a movable sleeve surrounding said shell and splined on said hub, said sleeve having teeth interengageable with teeth on said shell, the latter teeth being located on the end of said shell most remote from said hub, said shell having a plurality of uniformly spaced slots therein; a pair of opposed pawls carried by a portion of said one structure and adapted to be projected from a disengaged position into an engaging position relative to said slots to lock said structures against relative rotation when said sleeve is also engaged; a sleeve blocker carried by said shell and arranged in radial alignment with said shell slots; a laterally extending pin on each of said pawls, a split ring having frictional drive engagement with said shell, a pair of spaced lugs on said ring straddling each of said pins and adapted for drive engagement with said pins in the disengaged position of said pawls when relative rotational tendency exists between said pawls and shell, one of said lugs of each pair being engageable with said pins when the pawls rotatably tend to lead the shell, the other of each pair of lugs being engageable with said pins when the shell rotatably tends to lead the pawl; a blocker land on said ring adjacent each of said lugs for engaging said pins when also engaged with said lugs to prevent projection of said pawls into engaging position; and a recess on said ring between each of said pairs of lugs adapted to receive said pins in response to a relative directional change of rotation of said pawls and shell whereby the pins leave said lands with which they are engaged and enter said recess to thereby permit engagement of said pawls in the slots of said shell; the split in said ring being located intermediate said pairs of lugs; and said slotted shell and teeth thereof, said pawl, said pawl carrying portion, said sleeve blocker and said split ring being all contained within the axial length of said sleeve when the latter is engaged with the teeth of said shell.

14. Transmission mechanism as claimed in claim 13 wherein each of said pairs of lugs are substantially equally distant from the split in said ring.

WILLIAM T. DUNN.

References Cited in the file of this patent

UNITED STATES PATENTS

| Number | Name | Date |
|---|---|---|
| 2,278,623 | Orr | Apr. 7, 1942 |
| 2,286,585 | Simpson | June 16, 1942 |
| 2,343,312 | Maurer | Mar. 7, 1944 |
| 2,448,539 | Maurer | Sept. 7, 1948 |